J. A. ALVEY
LOADING MECHANISM FOR PACKAGE CONVEYERS.
APPLICATION FILED DEC. 14, 1914.
1,219,900.
Patented Mar. 20, 1917.
2 SHEETS—SHEET 1.
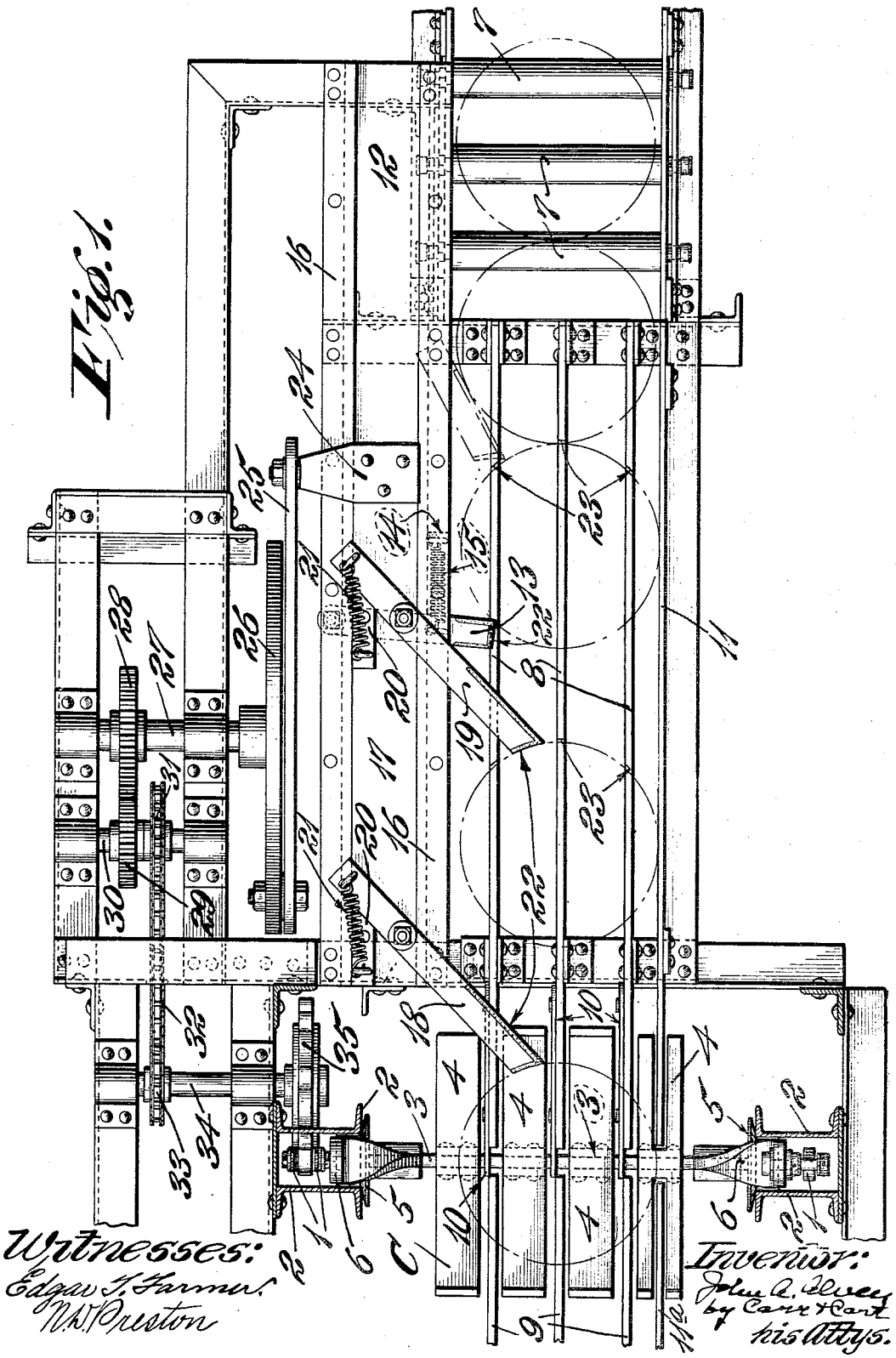

J. A. ALVEY.
LOADING MECHANISM FOR PACKAGE CONVEYERS.
APPLICATION FILED DEC. 14, 1914.
1,219,900.
Patented Mar. 20, 1917.
2 SHEETS—SHEET 2.
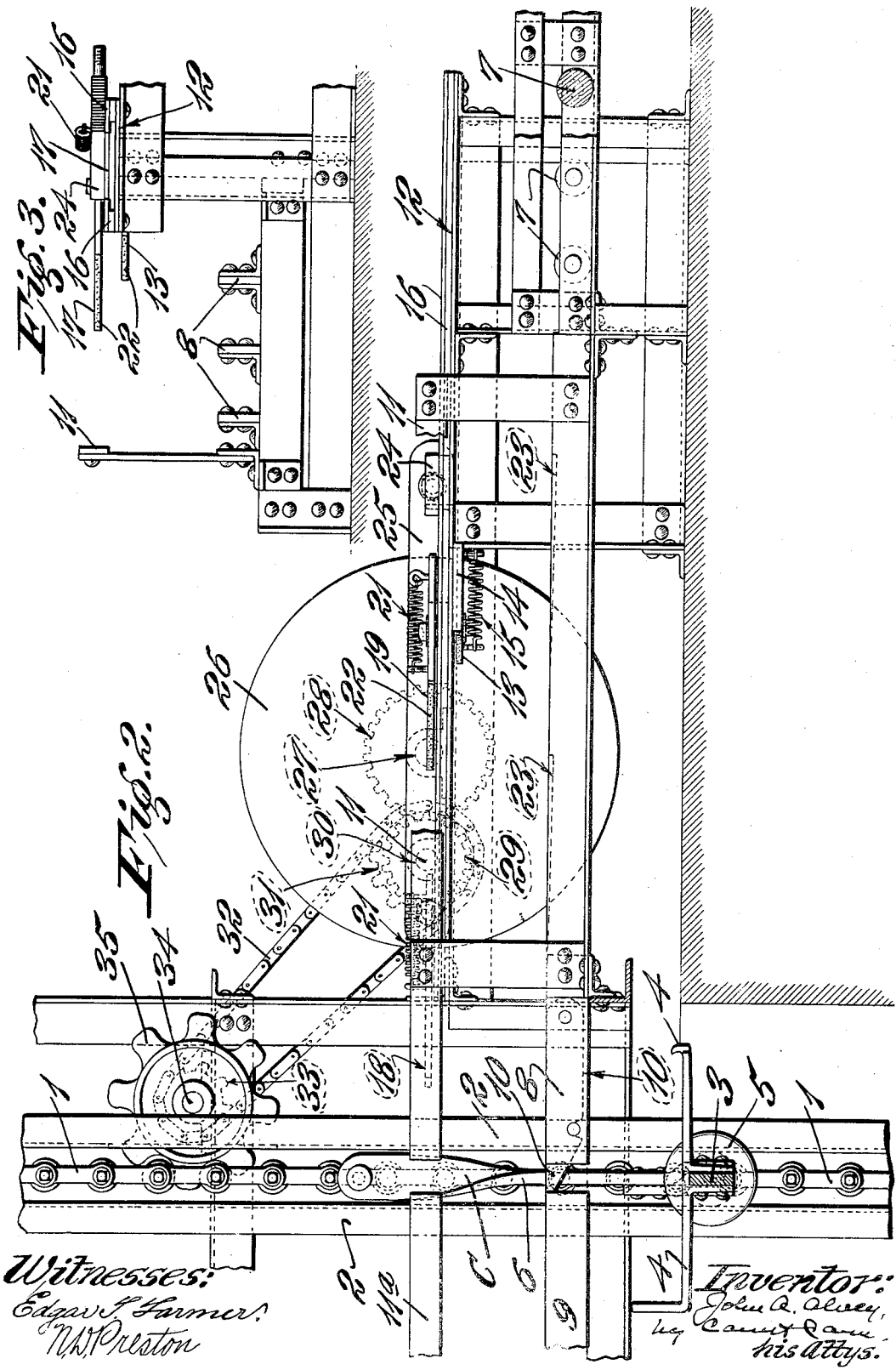

UNITED STATES PATENT OFFICE.

JOHN A. ALVEY, OF ST. LOUIS, MISSOURI, ASSIGNOR TO ALVEY MANUFACTURING COMPANY, OF ST. LOUIS, MISSOURI, A CORPORATION OF MISSOURI.

LOADING MECHANISM FOR PACKAGE-CONVEYERS.

1,219,900. Specification of Letters Patent. Patented Mar. 20, 1917.

Application filed December 14, 1914. Serial No. 877,080.

*To all whom it may concern:*

Be it known that I, JOHN A. ALVEY, a citizen of the United States, and a resident of the city of St. Louis and State of Missouri, have invented a new and useful Improvement in Loading Mechanisms for Package-Conveyers, of which the following is a specification.

My invention relates to devices for automatically loading packages on the carriers of package elevators, package conveyers and the like.

The invention has for one of its objects a loading mechanism which automatically delivers a predetermined number of packages at a time into position to be automatically conveyed away by the carriers of a package elevator, package conveyer or the like. A further object is a loading mechanism which is controlled by the elevator, and which operates to deliver positively a certain number of packages to the carriers of the elevator at intervals corresponding to the times when the carriers are ready to receive the packages. A still further object is a loading mechanism which is capable of receiving a line or series of packages and which separates a predetermined number of packages from the line of packages, and positively delivers this number of packages to the carriers of the package elevator. Further objects are to attain certain advantages which will be more fully set forth hereinafter.

Generally stated, the invention consists in a stop device against which the packages are conveyed either separately or in a line, and in a mechanism coöperating with said stop device which automatically engages a certain number of packages standing against said stop device and pushes these packages into position to be engaged by the carriers of the package elevator. The invention further consists in the parts and in the arrangements and combinations of parts, more fully set forth hereinafter.

In the accompanying drawings which form part of this specification and in which like reference characters refer to like parts in the several views;

Figure 1 is a top plan view of a loading mechanism embodying the invention, showing said loading mechanism applied to a vertical package elevator;

Fig. 2 is a side elevation of the loading mechanism shown in Fig. 1; and

Fig. 3 is a fragmentary end elevation of the same with the roller conveyer removed.

The drawings show a loading mechanism constructed and arranged to load substantially cylindrical objects, such as barrels, tubs and cans, on the carriers of a vertical package elevator. The construction of the package elevator forms no part of the present invention, and only as much of this construction is shown as is necessary to make clear the operation of the loading mechanism. The package elevator comprises carriers or trays C connected between two endless sprocket chains 1 which are vertically arranged in parallel planes. These sprocket chains 1 are guided in vertical posts or standards 2 in such a way that the carriers move up one side of the elevator and down the opposite side. The drawings only show the two posts on the side of the elevator where the carriers move upwardly. Each of these posts 2 comprises two channels arranged back to back with a space between them and fastened together by a plate. Each carrier C comprises a horizontal cross-bar 3 to which are fastened spaced transverse carrier bars 4. The cross-bar 3 is provided at each end with a flanged roller 5 which fits in the spaces in the posts 2 and guides the carriers. The cross-bar 3 is supported from the sprocket chains 1 by hanger bars 6 pivotally connected to said sprocket chains.

The parts of the loading mechanism are mounted on a suitable frame, which is preferably constructed of angle irons and plates, and which is suitably connected to the frame of the elevator and to the floor, or other fixed part of the building. The packages are conveyed to the loading mechanism by a roller conveyer 7 and they may be delivered one at a time or in files of two or more to the loading mechanism. Opposite the delivering end of the roller conveyer is a way comprising spaced bars 8 securely fastened to the frame of the loading mechanism. For convenience of description the end of the loading mechanism adjacent to the elevator will be termed the front or forward end, and the end adjacent to the roller conveyer 7 will be termed the rear end. The bars 8 of the way extend forwardly, that is, in the direction of movement of the packages, into the path of movement of the carriers C, nearly to the middle thereof, the carrier bars 4 of said carriers being arranged to clear the bars 8. Secured to the frame of the elevator opposite to the ends of the bars 8 of the way are auxiliary loading bars or fingers 9 which extend rearwardly into the path of movement of the carriers C, nearly to the middle thereof. Between the ends of the bars 8 of the way, and the auxiliary loading bars 9 is a space through which the cross-bars 3 of the carriers can pass, and spanning said space are dogs 10 which are pivoted to the ends of the bars 8 to swing upwardly but not downwardly.

Along one side of the way is a guide-bar 11 which is fixed to the frame of the loading mechanism, and which extends forwardly into the path of movement of the carriers C, one of the carrier bars 4 of the carriers being cut away to allow said guide-bar to clear the carriers. Secured to the frame of the elevator opposite to the guide-bar 11 is a similar guide-bar 11ª. At the other side of the way is a fixed plate 12, extending parallel with said way. Pivoted at one end to the under side of the plate 12 is a stop arm 13 which extends into the way to arrest the movement of packages along said way. Secured to the plate 12 is a block 14 which limits the movement of the stop arm 13 rearwardly, that is, in a direction away from the elevator. Between the stop arm 13 and the plate 12 is connected a tension spring 15 which holds said stop arm 13 normally against the block 14. The strength of the spring 15 is such that the packages cannot press by the stop arm 13. Extending longitudinally of the plate 12 on the top thereof are spaced guides 16 between which is slidably mounted a reciprocating member 17. To the reciprocating member 17 are pivoted two pushing fingers 18 and 19, one finger 18 being located near the front end of said member, and the other finger 19 being located near the middle thereof. The distance between the points where the pushing fingers 18 and 19 are pivoted to the reciprocating member 17 is greater than the length of the packages to be loaded. The pushing fingers 18 and 19 extend forwardly and obliquely across the way into the path of movement of the packages. Fixed to the reciprocating member 17 are blocks 20 which act as stops to prevent the outer ends of the pushing fingers 18 and 19 from moving rearwardly relatively to the reciprocating member 17 beyond a certain point. Connected between each of the pushing fingers 18 and 19 and the reciprocating member 17 is a tension spring 21 which holds said pushing finger normally against the corresponding block 20. The springs 21 are comparatively weak and permit the pushing fingers 18 and 19 to be pressed back by a package on the way as the reciprocating member 17 moves rearwardly. The pushing fingers 18 and 19 and also the stop arm 13 are preferably provided with pads 22 of leather or similar material at their outer ends and along the portions of the sides thereof which touch the packages during the operation of the loading mechanism, so that said pushing fingers and stop arm are not liable to injure the packages. In the upper edges of the bars 8 of the way are two rows of shoulders 23. One row of shoulders 23 is located in the rear of the stop arm 13 to engage behind the lower edge of the package standing against said stop arm. The other row of shoulders 23 is located in front of the first mentioned set to engage behind the lower edge of a package as it is left by the rear pushing finger 19.

Fixed to the reciprocating member 17 is an arm 24 to which is pivotally connected one end of a connecting rod 25. The other end of the connecting rod 25 is pivoted to a disk 26. The disk 26 is secured to one enl of a shaft 27 which is mounted for rotation in suitable bearings fixed to the frame of the loading mechanism. Secured to the shaft 27 is a gear 28 which meshes with a gear 29 fixed on a second shaft 30. Secured to the second shaft 30 is a sprocket wheel 31 which is connected by means of a sprocket chain 32 to a second sprocket wheel 33 which is fixed to a counter-shaft 34 secured to a frame of the elevator. The counter-shaft 34 has secured thereto a sprocket wheel 35 which has large teeth meshing with the sprocket chains 1 of the elevator.

The operation of the loading mechanism is as follows: The packages, which in this instance are assumed to be milk cans, are delivered to the loading mechanism by the roller conveyer 7. The cans will be delivered to the loading mechanism according as the cans are loaded on the roller conveyer, either singly or several in close succession. In either case the cans pass along the way until the foremost can is stopped by the stop arm 13. In case the cans are conveyed to the loading mechanism faster than the loading mechanism can deliver them to the elevator, they will come to a stand behind the stop arm 13 in a line. As the sprocket chains 1 travel upwardly and raise the carriers C with them, the sprocket wheel 35 of the countershaft 34 is rotated, and the motion thereof is transmitted by means of the sprocket wheels 31 and 33, the sprocket chain 32 and the gears 28 and 29 to the shaft 27. The disk 26 revolves with the shaft 27 and by means of a connecting rod 25 moves the reciprocating member 17 back and forth. Assuming that the reciprocating member 17 is in its forward position, as shown in full lines in Fig. 1, and that said reciprocating member moves rearwardly, the rear pushing finger 19 is pressed back by the foremost can, and when in its rearmost position (as shown by dot and dash lines in Fig. 1) it is forced outwardly by the spring 21 to engage behind the foremost can. As the reciprocating member 17 moves forwardly the rear pushing finger 19 pushes said foremost can past the stop arm 13 toward the elevator to the position indicated by the dot and dash lines in Fig. 1. As the reciprocating member 17 moves rearwardly again the front pushing finger 18 is pressed back by said foremost can, and when said front pushing finger reaches its rearmost position, (which corresponds to the forward position of the rear pushing finger 19,) said front pushing finger is swung by the spring 21 behind the foremost can. As the reciprocating member moves forward again the front pushing finger 18 pushes said foremost can along the bars 8 into the path of movement of the carriers C. In the meantime, the rear pushing finger 19 has pushed another can from the head of the line of cans past the stop arm 13 into the position to be engaged by the front pushing finger 18. The shoulders 23 in the upper edges of the bars 8 of the way prevent the cans from being pushed backward as the pushing fingers 18 and 19 strike them, and make it certain that said pushing fingers will be pressed back, whether the cans are empty or full. The parts of the loading mechanism are so proportioned and so connected to the sprocket chains 1 of the elevator that a package will be pushed into the path of movement of the carriers just before a carrier reaches the bars 8 of the way and the auxiliary loading bars 9.

The loading mechanism shown and hereinbefore described loads the packages positively, so that there is no danger that the operation of the elevator will be interrupted by any slight sticking or catching of the packages. The loading mechanism operates the same whether the packages are conveyed to it one at a time or several at once. Consequently, the loading mechanism will operate under conditions where a number of packages, such as those contained in a wagon load, are rapidly loaded on the roller conveyer faster than the elevator can elevate them. The moving parts of the loading mechanism are operated continuously, and the packages are moved smoothly without sudden shocks or jars. The loading mechanism is controlled by the elevator, and operates in synchronism therewith, whereby a package is positively delivered to the carriers of the elevator at the time when a carrier is ready to receive it, so that no time is lost in loading the carriers. The loading mechanism is capable of rapid operation, and thus increases the capacity of the elevator.

While for the purpose of illustration the invention has been shown and described as embodied in a loading mechanism for vertical package elevators, it may be used to load packages on the carriers of horizontally moving package conveyers or the like. Also, while the loading mechanism shown is designed for use with cans, the construction can be easily changed without departing from the invention so as to be used with barrels, boxes or other packages. In some cases one pushing finger may be used instead of two, and in other cases more than two may be used if desired. Other changes may be made in the particular construction shown and described without departing from the invention, and I do not wish to be restricted to the details of this construction shown and described.

What I claim as my invention is:

1. A package conveyer having moving carriers, a stationary way leading to said conveyer, and an intermittently operating loading mechanism for moving the packages along said way to said carriers, said loading mechanism comprising a yieldable stop device for arresting the movement of the packages along said way, and means controlled by said carriers for transferring a predetermined number of packages standing behind said stop device along said way into the path of movement of said carriers.

2. A package conveyer having moving carriers, a stationary way leading to said conveyer, and a loading mechanism for moving packages along said way to the carriers of said conveyer, said loading mechanism comprising means for arresting the movement of the packages along said way, a reciprocating member operatively connected to said carriers, and a pushing finger connected to said member and arranged to engage behind a predetermined number of packages arrested by said means, said finger operating to push said predetermined number of packages along said way into position to be automatically conveyed away from said carriers.

3. A package conveyer having moving carriers, a stationary way leading to said conveyer and arranged to receive packages in a line, and a loading mechanism for moving packages along said way to the carriers of said conveyer, said loading mechanism comprising a yieldable stop device normally extending into the path of movement of the packages along said way, a reciprocating member operatively connected to said carriers, a pushing finger pivoted to said reciprocating member, said reciprocating member having a stop secured thereto which limits the movement of the outer end of said finger in a direction away from the conveyer, and resilient means for swinging the said finger toward said stop.

4. A package conveyer having moving carriers, a stationary way leading to said conveyer, a loading mechanism for moving packages along said way to the carriers of said conveyer, said loading mechanism comprising means for arresting the movement of the packages along said way, a reciprocating member extending along one side of said way and operatively connected to said carriers, pushing fingers connected to said reciprocating member and normally projecting into said way, and a fixed guide-bar extending along the other side of said way.

5. A package conveyer having moving carriers, a stationary way leading to said conveyer, and a loading mechanism for moving packages along said way to said carriers, said loading mechanism comprising a stop device for arresting the movement of the packages along said way, a reciprocating member operatively connected to said conveyer and arranged to push a predetermined number of packages along said way into position to be engaged by said carriers, and means on said way for preventing movement of said packages away from said conveyer.

6. A package conveyer having moving carriers, a stationary way leading to said conveyer comprising spaced horizontal bars, and a loading mechanism for moving packages along said way to said carriers, said loading mechanism comprising a reciprocating member operatively connected to said conveyer and having pushing fingers movably connected thereto, the bars of said way having shoulders formed on their top faces for preventing the movement of packages away from said conveyer.

7. A package elevator comprising a frame, sprocket chains guided in said frame, carriers connected at intervals to said sprocket chains, said sprocket chains being arranged for movement up one side of said frame, a conveyer adapted to move packages to a place adjacent to said frame, a device for arresting the movement of said packages, spaced fingers extending across the path of movement of said carriers, means for disengaging from said device a package stopped thereby and for pushing said package to said fingers, and means for pushing said package along said fingers into the path of movement of said carriers, both of said means being operatively connected to said sprocket chains.

Signed at St. Louis, Missouri this 12th day of December, 1914.

JOHN A. ALVEY.

In the presence of—
NEIL D. PRESTON,
MARTHA A. SHELTON.